Dec. 1, 1936.  F. T. COURT  2,062,351
ADJUSTING MEANS FOR AGRICULTURAL IMPLEMENTS
Original Filed April 30, 1934   2 Sheets-Sheet 2
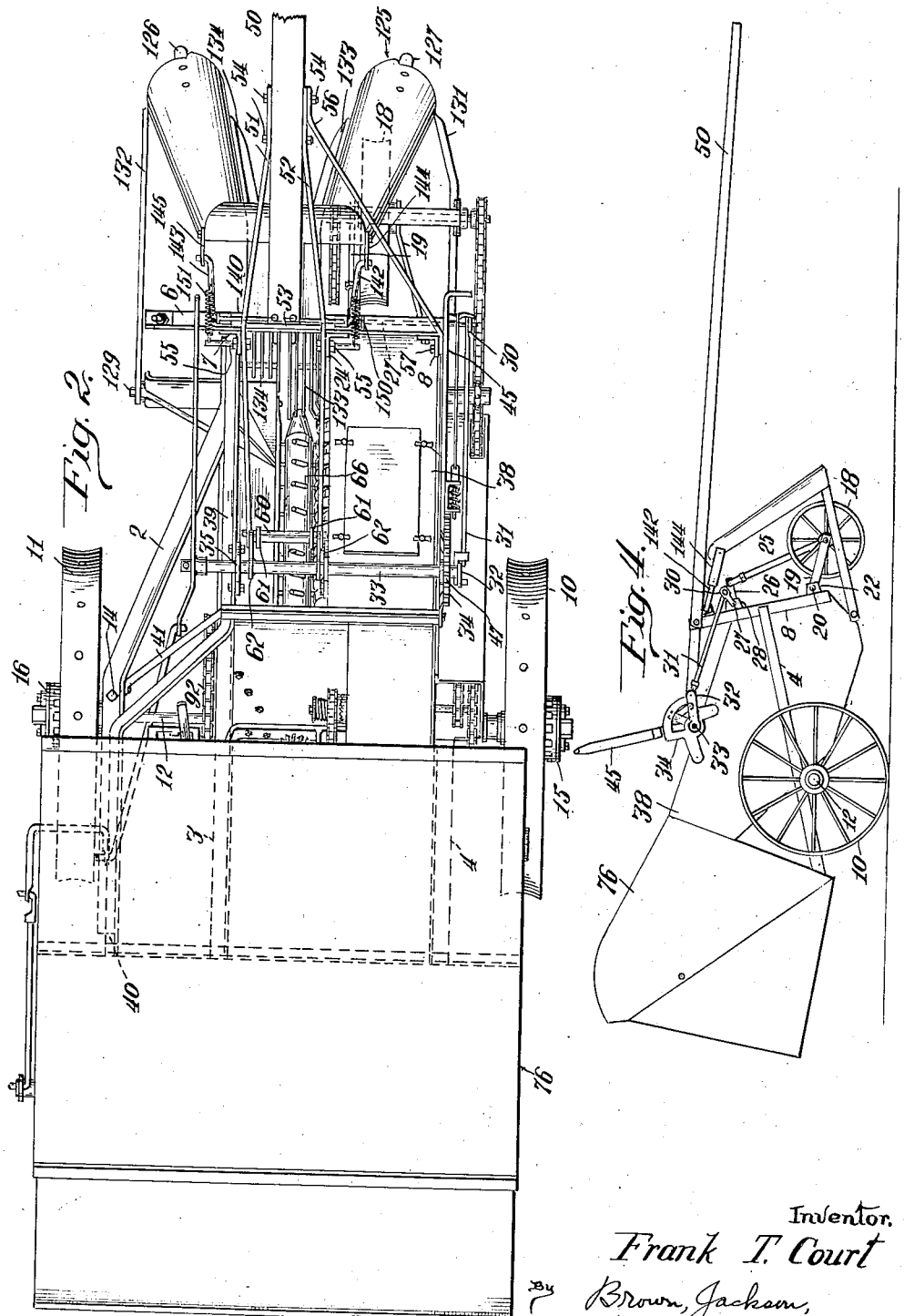
Inventor.
Frank T. Court
By Brown, Jackson,
Boettcher & Dienner
Attorneys.

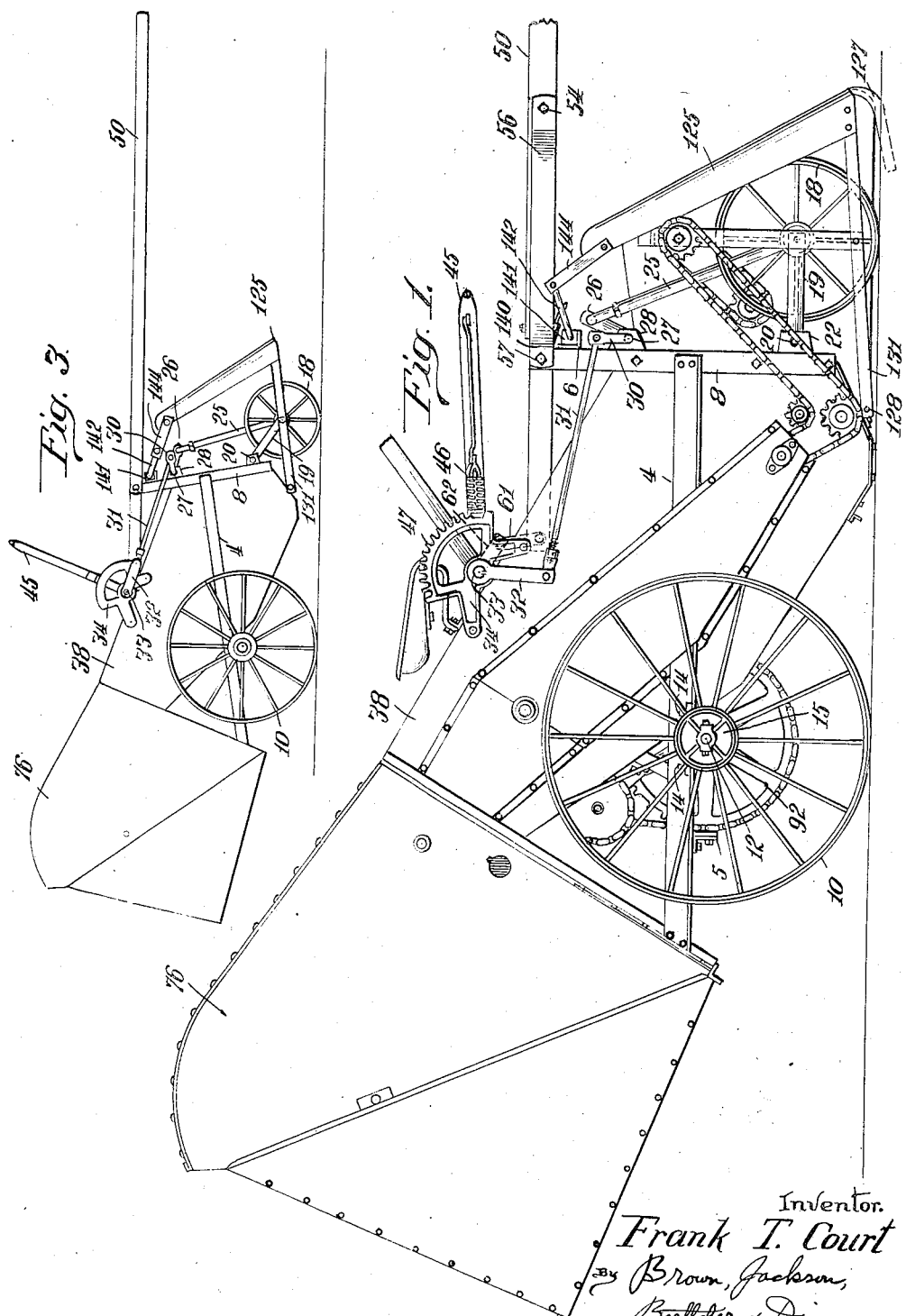

Patented Dec. 1, 1936

2,062,351

UNITED STATES PATENT OFFICE 2,062,351

ADJUSTING MEANS FOR AGRICULTURAL IMPLEMENTS

Frank T. Court, Moline, Ill., assignor to Deere & Company, Moline, Ill., a corporation of Illinois Original application April 30, 1934, Serial No. 723,131. Divided and this application January 18, 1935, Serial No. 2,359

21 Claims. (Cl. 56—218)

This application is a division of my copending application, Serial No. 723,131, filed April 30, 1934.

The present invention relates generally to agricultural implements and is particularly concerned with certain new and useful improvements in implements having operating mechanism whose position relative to the ground is capable of being adjusted.

One of the more important objects of the present invention is the provision of an implement with ground engaging supporting means and ground engaging gauge wheel means, in connection with adjusting means therefor which is interconnected with the member by which draft is applied to propel the implement, so that as the implement is adjusted relative to the ground, the draft member is likewise adjusted to accommodate such change in vertical position of the implement.

Another object of the present invention in this connection is the provision of adjusting means so constructed and arranged that, during normal operation, the gauge wheel is maintained in a ground engaging position so as to support at least a portion of the weight of the implement, but when the implement is to be transported from one field to another, the gauge wheel means is raised out of contact with the ground, this being for the purpose of facilitating the maneuvering of the implement during the transporting operation.

Another important object of the present invention is the provision of a horse drawn implement in which the main portion of the weight of the implement is supported on laterally spaced ground engaging means, such as wheels, and in which very little, if any, of the weight is imposed on the draft pole or upon the draft animals, particularly during the normal operation of the implement. In many implements of this sort, a considerable portion of the weight of the implement is disposed forwardly of the ground wheels, and this preponderance of weight is carried by the draft animals, being transmitted thereto through the draft pole and the neck yoke at the forward end thereof. According to the present invention, ground engaging gauge wheel means is provided, and both the gauge wheel and the draft pole are movably connected with the frame of the implement in such a manner that when the implement is adjusted for vertical height, the proper relation is maintained between the draft pole and the gauge wheel means, so that the latter continues to serve to relieve the draft animals from the weight of the forward end of the machine and, at the same time, the pole is maintained in proper position relative to the draft animals, the forward end of the draft pole not being raised or lowered by the operation of raising or lowering the front end of the implement.

Another object of the present invention resides in the provision of a horse drawn implement in which the front end of the draft pole supports little or no weight of the implement during the normal operation thereof but is adapted to carry some of the weight of the implement when the latter is arranged in its transport position.

More specifically, an important object of the present invention is the provision of an agricultural implement or machine of the horse drawn type having soil working or crop operating mechanism and carrying a hopper for the reception or distribution of material. For example, horse drawn cotton strippers usually have cotton stripping mechanism and are frequently equipped with a hopper to receive the stripped material. In a number of such horse drawn cotton strippers, no gauge wheel is provided and the machine is at all times, in operation as well as in transport position, supported on its two main carrying wheels and through the neck yoke connected at the front end of the draft tongue. The main supporting wheels are generally positioned so that, even when the hopper at the rear of the machine is full of cotton, there is at least some preponderance of the weight forward so that the draft animals support at least some portion of the weight of the machine through the neck yoke. This positioning of the wheels however, places excessive weight on the draft animals when the hopper is empty. Moreover, under certain conditions there is also a tendency for the machine to oscillate vertically about its main supporting wheels, causing the front end to bob up and down with consequent inferior operation and discomfort to the draft animals. Accordingly therefore, another object of the present invention is the provision of a cotton stripper or similar machine in which a wheel is provided for carrying the weight of the front end of the machine, including the major portion of the weight of the pole when the machine is in operation, with certain interconnections between the gauge wheel and the pole so that when the vertical adjustment of the front end of the implement is effected, the gauge wheel and pole are simultaneously given the proper adjustment also. Preferably, also, these interconnections are such that when the front end of the machine is raised up for transport, the gauge wheel is also lifted free of the ground so that thereafter the machine is supported only on its main carrying wheels and on the draft tongue or pole.

The above and other objects of the present invention will be apparent to those skilled in the art after a consideration of the following detailed description of the preferred embodiment, taken in conjunction with the accompanying drawings.

In the drawings:

Figure 1 is a side elevation of a horse drawn cotton stripper embodying the principles of the present invention;

Figure 2 is a top plan view of the machine shown in Figure 1;

Figure 3 illustrates the machine with the front end raised but with the gauge wheel still in contact with the ground; and Figure 4 shows the machine with both the front end and the gauge wheel raised clear of the ground so that the machine can be easily transported from one place to another.

The agricultural implement chosen to illustrate the principles of the present invention comprises a cotton stripper of the horse drawn type having crop gathering means disposed forward of the main supporting wheels and a cotton receiving hopper generally rearwardly thereof, but it is to be understood that the present invention might be incorporated in any agricultural machine supported mainly on a pair of laterally spaced wheels and having soil working or crop operating mechanism.

Referring now more particularly to Figures 1 and 2, the illustrated cotton stripper is shown as having a frame comprising longitudinally extending angle members 2, 3 and 4, the angle members 3 and 4 being parallel, as best shown in Figure 2, while the angle member 2 includes a diagonal section 2a, the front end of the member 2 being connected to the front end of member 3 while its rear portion is laterally spaced therefrom. At their rear ends the frame members 2, 3 and 4 are connected together by means of a cross frame member 5. At their forward ends the frame members 2, 3, and 4 are connected together by means of a cross member 6 bolted to laterally spaced vertical members 7 and 8, the latter being fixed, as by rivets or the like, intermediate their ends to the longitudinal frame members 3 and 4, respectively. The cross member 6, as best shown in Figure 1, is connected at the upper ends of the vertical members 7 and 8.

The implement frame is supported on two laterally spaced ground engaging supporting means in the form of wheels 10 and 11 journaled on an axle 12. The latter is received in suitable bearings secured by bolts 14 to the underside of the frame members 3 and 4, and the axle 12 is driven from the supporting wheels 10 and 11 through the usual ratchet mechanisms 15 and 16. The fore and aft spacing of the supporting wheels 10 and 11 is such that these wheels serve to support the principal portion of the weight of the implement and associated parts. However, the preponderance of weight of the implement is forward, and the forward end of the implement is supported when in operation on a front supporting or gauge wheel 18 which is journaled on a spindle fixed to a pair of forwardly extending arms 19 the rear ends of which are mounted on or fixedly secured to a shaft or spindle 20 carried by a pair of brackets 22. The right hand bracket 22 is fixed directly to the vertical frame member 8 (Figure 1) and the left hand bracket is secured to an intermediate vertical front bar 24 (Figure 2), the brackets being fixed to the lower ends of these frame members. The frame member 24 is fixed to and depends from the front cross frame member 6.

The arms 19 carrying the gauge wheel 18 are disposed in a generally horizontal position and are capable of being shifted vertically to adjust the position of the gauge wheel relative to the front end of the implement, thereby adjusting the height of operation of the mechanism or mechanisms supported on the implement. The inner end of the spindle upon which the gauge wheel is mounted is connected by means of a link 25 with an arm 26 on the inner end of a rock shaft 27 supported in suitable brackets 28, one of the brackets being fixed to the vertical frame member 8 while the other is affixed to the vertical frame member 24. As best shown in Figure 1, the rock shaft 27 is provided with an arm 30 at its laterally outer end and this arm is connected by means of a link 31 with an arm 32 provided on a rock shaft 33. The rock shaft 33 is journaled in a bearing formed integral with a casting member 34 (Figure 1) and in a perforation formed in a bracket 35 at the other side of the machine (Figure 2). The casting 34 is fixed to the side of a housing 38 which encloses certain portions of the stripping mechanism and is supported by and fixed to the frame of the implement. The bracket 35 is suitably fixed, as best shown in Figure 2, to an angle member 39 which is connected at its forward end to the vertical frame member 7 and at or near its rear end to a downwardly and rearwardly extending angle member 40, the latter being connected at its lower end with the frame member 2. The frame member 39 is braced to the frame member 2 by means of a member 41 which is connected at its lower end to the frame member 2 and extends forwardly and laterally upwardly where it is connected to the member 39.

Since the vertical position of the gauge wheel 18 relative to the front end of the implement is controlled by the rocking of the rock shaft 33, a lever 45 is fixed to this rock shaft and is adapted to be locked in various positions of adjustment by means of a latch 46 cooperating with notches in a sector 47 formed integral with the casting 34. Thus, by releasing the lever 45 and shifting the same to various positions, the gauge wheel 18 can be raised or lowered, relative to the front end of the implement, thereby adjusting the vertical position of the latter as desired. During normal operation, the gauge wheel 18 supports the front end of the implement and the link members 25 and 31 are under compression, the gauge wheel 18 reacting through these links against the frame of the implement in supporting the front end thereof.

The implement is provided with a draft pole or tongue 50 which is connected at its rear end to two spaced members 51 and 52 (Figure 2) which, while forming a rigid part of the draft pole, extend rearwardly therefrom and adjacent their intermediate portions carry a transverse brace member 53 fixed between them and to which the rear end of the pole proper or tongue 50 is secured, as by bolting. The forward ends of the members 51 and 52 are bolted, as at 54, to the rear portion of the pole 50, as best shown in Figure 2. The draft tongue assembly 50 is pivotally supported on a frame of the implement by means of pivot bolts 55 which pass through perforations in the members 51 and 52 and perforations in the upper ends of the vertical frame members 7 and 24. The bolts 55 therefore define a pivotal axis about which the draft pole 50 swings relative to the implement frame. The tongue 50 is further braced against lateral movement with respect to the implement frame by means of a diagonal brace member 56 connected to the side of the pole 50 by means of one of the bolts 54. The rear end of the diagonal brace 56 is pivotally connected by means of a pivot bolt 57 to the vertical frame member 8, it being noted from Figure 2 that the pivot bolt 57 is disposed in alignment with the pivotal axis of the tongue as defined by the pivot bolts 55.

The rear ends of the tongue members 51 and 52 are connected together by means of a cross member 60 (Figure 2) and this member is connected by means of a pair of laterally spaced links 61 to a pair of arms 62 fixed in laterally spaced relation to the rock shaft 33 which, as described, controls the vertical position of the gauge wheel 18 relative to the front end of the implement. The position and length of the arms 32 and 62, fixed on the rock shaft 33, and the arms 26 and 30, fixed to or carried by the rock shaft 27 and controlling the gauge wheel 18, are such that whenever the lever 45 is manipulated to change the vertical position of the front end of the frame for the purpose of varying the height of operation of the stripping mechanism, the angular position of the draft pole 50 in a vertical plane is likewise changed to correspond.

The purpose of this arrangement is to maintain the front end of the draft tongue 50 at approximately the same point throughout all height adjustments during the operation of the implement. That is to say, when the lever 45 has been swung upwardly from the position shown in Figure 1 to the position shown in Figure 3, the arm 32 will be rocked in a counterclockwise direction, exerting a thrust on the links 31 and 25 and reacting against the gauge wheel 18 to raise the front end of the implement. However, at the same time that the arm 32 on the rock shaft 33 had been swung in a counterclockwise direction, the arms 62, which are connected through the links 61 with the rear end of the draft tongue assembly 50, are also swung in a counterclockwise direction thus swinging the tongue assembly also in a counterclockwise direction about its pivot axis on the implement frame. Therefore, as the front end of the implement is raised the front end of the draft pole 50 is lowered. The relation between the links and arms is such, as mentioned above, that the forward end of the pole is lowered practically the same extent that the front end of the implement is raised. Thus, the vertical height of operation of the stripping mechanism can be varied throughout the range represented by the movement of the lever 45 from the position shown in Figure 1 to the position shown in Figure 3 while, at the same time, keeping the front end of the tongue 50 at about the same level. Figure 4 represents the implement arranged for transport, and in this position it will be observed that the gauge wheel is entirely free of the ground and has been lifted so that the machine is supported only on its two wheels 10 and 11 and, of course, at the front end of the tongue 50 on the neck yoke. Maneuvering of the implement when arranged in this fashion is much more easily accomplished than when the implement is supported on the gauge wheel 18, particularly since the latter does not caster.

The means by which the gauge wheel 18 is thus moved downwardly relative to the front end of the frame so as to adjust the vertical position of the latter during normal operation and by which subsequently the implement can be arranged for transport with the gauge wheel clear of the ground is illustrated in Figures 1, 3 and 4. Mention has been made of the fact that when the lever 45 has been moved from the position shown in Figure 1 to the position shown in Figure 3, the gauge wheel has been moved from a position in which the arms 19 are substantially horizontal to a position, representing the raised operating position of the implement, shown in Figure 3 in which the arms 19 extend downwardly at approximately an angle of 45°. During this range of movement it will be observed that the links 25 and 31 are under compression, and in the extreme raised operative position of the implement, illustrated in Figure 3, it will be observed that the arm 32 and link 31 are in alignment. Further counterclockwise movement of the lever 45 toward the position shown in Figure 4 will accomplish two things. First, tension will be placed in the links 31 and 25 to hold the gauge wheel clear of the ground and, second, the arms 62, connected with the rear end of the tongue 50, will continue to raise the rear end of the latter relative to the implement so as to swing the front end thereof downwardly. This end is supported on the neck yoke, and since this is carried by the draft animals the front end of the implement will be raised and the gauge wheel 18 will likewise be lifted off the ground to an extent depending upon the amount the lever 45 is swung rearwardly from its position shown in Figure 5. The rear group of notches in the sector 47 affords several positions for the lever 45 in the transport range of its movement. Thus, the adjusting lever 45 and associated parts actually serve as three separate means, first as a means for adjusting the vertical position of the front end of the implement on the ground engaging wheel 18, second as a means for simultaneously adjusting the draft member 50 to correspond to the vertical position of the implement, and third as a means for subjecting the tongue 50 to the weight of the front end of the implement to raise not only the implement but also the gauge wheel 18 clear of the ground to arrange the machine for transport.

The present invention is not concerned with the details per se of the cotton stripping and handling mechanisms, the same being described and claimed in my aforesaid copending application. In general, the cotton stripping and handling mechanism employed in the illustrated machine includes a generally downwardly and forwardly extending stripping means in the form of a rotatable roll 66 enclosed within the housing 38 and arranged to remove cotton bolls from the plants and deliver them to cotton conveying or elevating means in the form of rotatable elevating members enclosed within the housing 38 at one side of the machine and which perform a preliminary cleaning operation on the cotton and deliver it into a hopper 76 supported at the rear of the implement frame. The rear end of the conveying mechanism communicates with the hopper 76 through a delivery opening toward which the stripped and preliminarily cleaned cotton is directed. A spreader is disposed in the path of movement of the cotton directed toward and through the delivery opening for the purpose of receiving the cotton from the last elevating member and directing it to different parts of the hopper 76, as best described in my aforesaid copending application. The various operating parts are operatively connected, as by sprockets and chains, with a driving sprocket 92 on one of the driving wheels.

A hood 125 is pivotally connected to the front end of the implement frame and includes ground engaging shoes 126 and 127 which rest on the ground in the lower working positions of the implement. The shoes 126 and 127 serve to support the hood so that the latter follows the inequalities of the ground over which the implement is passing. The hood 125 is in the general form of a rectangular tunnel and is pivotally connected, as aforesaid, to the implement frame at points 128 and 129 by longitudinally disposed bars 131 connected at their front ends to the lower side portions of the hood 125 and at their intermediate portions to vertical bars 132 forming a part of the hood. The hood 125 carries the grates 133 and 134 for the purpose of directing plants and such cotton as may have fallen on the ground into the stripping mechanism.

The floating movement of the hood about its pivotal connections 128 and 129 is limited by a collapsible connection with the upper transverse frame member 6 which comprises a rocking member 140 which is journaled in brackets 141 carried by the frame member 6 and is provided with forwardly extending arms 142 and 143. Links 144 and 145 serve to connect the arms 142 and 143 with the opposite sides of the hood 125.

When the implement is raised into one of its higher operating positions, the arms 142 and 143 and the associated links 144 and 145, assume a position of alignment, as indicated in Figure 3, and any subsequent raising of the implement, as to its transport position shown in Figure 4, also raises the hood 125 bodily therewith. As indicated in Figure 3, the hood 125 is raised off the ground sometime before the gauge wheel 18 is lifted clear of the ground. However, even though the shoes 126 and 127 are on the ground, some of the weight of the front end of the hood 125 is carried by the implement, by virtue of springs 150 and 151 which are connected to the laterally extending ends of the two pivot bolts 55 and to the arms 142 and 143.

While I have shown and described above the preferred structure in which the principles of the present invention have been embodied, it will be apparent that my invention is not to be limited to the specific details shown and described above, but that, in fact, widely different means may be employed in the practice of the broader aspects of my invention.

What I claim, therefore, and desire to secure by Letters Patent is:

1. An agricultural implement comprising an implement frame, ground engaging supporting means carrying at least a portion of the weight of said implement, draft means movably connected with said frame, gauge means for said implement movably connected with said frame, and adjusting mechanism acting against the gauge wheel to raise the forward end of the frame and against said movable draft means to lower the forward portion of the latter so as to maintain the same substantially the same distance above the ground.

2. An agricultural implement comprising an implement frame, ground engaging supporting means carrying at least a portion of the weight of said frame, draft means movably connected with said frame, operating mechanism including parts carried adjacent the front end of said frame, a gauge wheel for said mechanism movably connected with said frame, and adjusting mechanism including a rockably mounted member link-connected to both said draft means and said gauge wheel for simultaneously shifting them to adjusted position.

3. An agricultural implement comprising a frame, ground engaging means tiltably supporting said frame, a draft member pivotally connected with said frame to accommodate tilting movement of the latter, movably mounted gauge wheel means carried by the forward end of said frame, and means for adjusting the vertical position of the forward end of said frame including mechanism carried by said frame and interconnected with both said gauge wheel means and said draft pole to pivot the latter on the frame to correspond to different positions of adjustment of the front end of said frame relative to the gauge wheel means.

4. An agricultural implement comprising a frame, ground engaging means tiltably supporting said frame for vertical movement, a draft member pivotally connected with said frame, gauge wheel means movably connected with said frame independently of the connection of the draft member therewith and adapted to engage the ground during the normal operation of the implement, linkage means connected, respectively, to said draft member and said gauge wheel means, and means operatively connected with said linkage means and movable relative to said frame, said movable means being operative by said relative movement to adjust said linkage and position both said gauge wheel means and said draft member according to the vertical position of said tiltably mounted frame.

5. An agricultural implement comprising a frame, a pair of laterally spaced ground engaging supporting means supporting the major portion of the weight of said frame, a forwardly extending draft member pivotally connected with said frame in rear of the forward end thereof, movably mounted gauge wheel means carried by the frame adjacent the forward end thereof, a rockable member journaled on the frame adjacent the rear end of said draft member, means connecting the rear end of the draft member with said rockable member, and means also connecting said rockable member with said gauge wheel means for adjusting the vertical position of the forward end of said frame and simultaneously swinging said draft member about its pivot on the implement frame.

6. An agricultural implement comprising a frame, a pair of laterally spaced ground engaging means supporting said frame for tilting movement in a generally vertical direction, a draft member pivotally connected with said frame adjacent the front end thereof and including a portion extending rearwardly of the pivotal axis thereof, a rock shaft carried by said frame adjacent said rearwardly extended portion of the draft member, an arm carried by said rock shaft and link connected with said extended end of the draft member, swingably mounted gauge wheel means arranged to support at least a portion of the weight of said frame and disposed adjacent the forward end of the latter, a second arm carried by said rock shaft, link means connecting said second arm with said gauge wheel, whereby the rocking of said shaft simultaneously adjusts both said draft member and said gauge wheel relative to the frame, and means for swinging said rock shaft.

7. An agricultural implement comprising a frame, a pair of laterally spaced wheels supporting said frame, a third wheel connected to the front end of said frame for vertical movement relative to the frame, a forwardly extending pole connected to said frame and adapted to be supported at its front end by draft means, means for adjusting the angular relation between said pole and said frame to vary the vertical position of the front end of said frame relative to the ground within a working range and to raise the front end of said frame to a transport position, and means interconnecting said adjusting means and said third wheel for simultaneously adjusting the position of said third wheel relative to the frame to cause said third wheel to carry at least a portion of the weight of the front end of the frame in all adjusted positions of the frame within the working range.

8. An agricultural implement comprising a frame, a pair of laterally spaced wheels supporting said frame, a third wheel connected to the front end of said frame for vertical movement relative to the frame, a forwardly extending pole connected to said frame and adapted to be supported at its front end by draft means, means for adjusting the angular relation between said pole and said frame to vary the vertical position of the front end of said frame relative to the ground within a working range and to raise the front end of said frame to a transport position, and means interconnecting said adjusting means and said third wheel for moving said third wheel relative to said frame substantially the same amount but in the opposite direction as the front end of said frame is moved when adjusted to any position within the working range.

9. An agricultural implement comprising a frame, a pair of laterally spaced wheels supporting said frame, a third wheel connected to the front end of said frame for vertical movement relative to the frame, a forwardly extending pole connected to said frame and adapted to be supported at its front end by draft means, means for adjusting the angular relation between said pole and said frame to vary the vertical position of the front end of said frame relative to the ground within a working range and to raise the front end of said frame to a transport position, and means interconnecting said adjusting means and said third wheel for moving said third wheel relative to said frame substantially the same amount but in the opposite direction as the front end of said frame is moved when adjusted to any position within the working range and for moving said third wheel relative to said frame in the same direction as the front end of said frame, when the latter is raised to a transport position.

10. An agricultural implement comprising a frame, a pair of laterally spaced wheels supporting said frame, a third wheel connected to the front end of said frame for vertical movement relative to the frame, a forwardly extending pole connected to said frame and adapted to be supported at its front end by draft means, means for adjusting the angular relation between said pole and said frame to vary the vertical position of the front end of said frame relative to the ground within a working range and to raise the front end of said frame to a transport position, means interconnecting said adjusting means and said third wheel for simultaneously adjusting the latter and said pole relative to the frame so as to cause said third wheel to carry at least a portion of the weight of the front end of the frame in all adjusted positions of the frame within said working range, and means for causing said third wheel to move with said frame when the front end of the latter is being raised to transport position.

11. An agricultural implement comprising an implement frame, ground engaging supporting means carrying at least a portion of the weight of said implement, draft means movably connected with said frame, ground engaging gauge means operative to support a portion of the weight of the implement, means for adjusting the position of the implement on said gauge means, and means for shifting the position of said draft means relative to the implement frame to correspond with the adjusted position of the implement on said gauge means.

12. An agricultural implement comprising an implement frame, ground engaging supporting means carrying at least a portion of the weight of said implement, draft means movably connected with said frame, ground engaging gauge means operative to support a portion of the weight of the implement, means for adjusting the position of the implement on said gauge means, and means operative with said last named means for automatically adjusting the position of said draft means to correspond with the adjusted position of the implement on said gauge means.

13. An agricultural implement comprising a frame, ground engaging means tiltably supporting said frame, a draft member pivotally connected with said frame to accommodate tilting movement of the latter, movably mounted gauge wheel means carried at the forward end of said frame, and means for adjusting the vertical position of the forward end of said frame including a member rockably mounted on said frame and acting against the rear end of said pivoted draft member to lower the front end thereof and against said gauge wheel means to raise the forward end of the frame simultaneously with the lowering of the forward end of said draft member.

14. An agricultural implement comprising a frame, ground engaging means tiltably supporting said frame, a draft member pivotally connected with said frame to accommodate tilting movement of the latter, movably mounted gauge wheel means carried at the forward end of said frame, and means for adjusting the vertical position of the forward end of said frame including mechanism acting initially against said gauge wheel means to raise the front end of said frame relative to both said gauge wheel means and said draft member, said adjusting mechanism being interconnected with both said gauge wheel means and said draft member so as to subsequently hold the gauge wheel means out of ground engaging position and to react against said draft member to raise the front end of the frame to transport position.

15. An agricultural implement comprising a frame, ground engaging means tiltably supporting said frame, a draft member pivotally connected with said frame to accommodate tilting movement of the latter, movably mounted gauge wheel means carried at the forward end of said frame, movable means operative throughout a portion of its range of movement for raising the forward end of the frame relative to said gauge means and operative throughout another portion of its range of movement for raising the gauge means relative to said frame, means for swinging said draft member relative to the frame, and means for causing said last two mentioned means to operate together so that throughout said first range said gauge means is lowered when the forward end of the draft member is swung in one direction relative to the frame and so that throughout said other range the gauge means is raised when the forward end of said draft member is swung in the same direction relative to the frame.

16. An agricultural implement comprising a frame, ground engaging means tiltably supporting said frame, a draft member pivotally connected with said frame to accommodate tilting movement of the latter, movably mounted gauge wheel means carried at the forward end of said frame, means for adjusting the vertical position of the forward end of said frame including mechanism acting initially against said gauge wheel means to raise the front end of said frame relative to both said gauge wheel means and said draft member, said adjusting mechanism being interconnected with both said gauge wheel means and said draft member so as to subsequently hold the gauge wheel means out of ground engaging position and to react against said draft member to raise the front end of the frame to transport position, a crop contacting member movably connected with the forward end of said frame and adapted to ride along the ground adjacent said gauge wheel means, and means limiting the relative movement between said frame and said crop contacting member so as to raise the latter with said frame when the frame is raised to transport position.

17. An agricultural implement comprising a frame including generally longitudinally disposed frame members, an axle connected with said frame members, ground engaging supporting wheels carrying at least a portion of the weight of the implement and journaled on said axle, said frame also including vertically disposed bars connected intermediate their ends to the forward ends of said frame members, a draft member pivotally connected to the upper ends of said vertical bars and extending both forwardly and rearwardly with respect to the pivot axis thereof, gauge wheel means for the forward end of said implement pivotally connected with the lower ends of said vertical bars, and adjusting means operatively connected with the rear end of said draft member and with said gauge wheel means, whereby the forward end of said draft member and said gauge wheel means move together as said adjusting means is actuated to raise and lower the forward end of the implement.

18. An agricultural implement comprising a frame including generally longitudinally disposed frame members, an axle connected with said frame members, ground engaging supporting wheels carrying at least a portion of the weight of the implement and journaled on said axle, said frame also including vertically disposed bars connected intermediate their ends to the forward ends of said frame members, a draft member pivotally connected to the upper ends of said vertical bars and extending both forwardly and rearwardly with respect to the pivot axis thereof, gauge wheel means for the forward end of said implement pivotally connected with the lower ends of said vertical bars, a crop contacting hood embracing said gauge wheel means and pivotally connected with the lower ends of said vertical bars, and adjusting means operatively connected with the rear end of said draft member and with said gauge wheel means, whereby the forward end of said draft member and said gauge wheel means move together as said adjusting means is actuated to raise and lower the forward end of the implement.

19. An agricultural implement comprising an implement frame including longitudinally disposed bars and vertical bars connected intermediate their ends to the forward ends of said longitudinal bars, an axle connected with said longitudinal bars adjacent their rear ends, supporting wheel means journaled on said axle, a draft member pivoted intermediate its ends to the upper ends of said vertical bars, forwardly extending arms pivotally connected with the lower ends of said vertical bars, a gauge wheel journaled at the forward ends of said bars, a rock shaft carried by said vertical bars and having an arm link-connected to said gauge wheel to raise and lower the same relative to the implement frame, said rock shaft carrying a second arm, a rearwardly extending link connected with said second arm to actuate said rock shaft, a lever pivotally connected with said frame and having an arm connected with said link, said lever being adapted to swing said last mentioned arm to exert a thrust on said link and rock said rock shaft, thereby raising the front end of the implement frame relative to the ground engaging gauge wheel, and means also operated by said lever for raising the rear end of said draft member relative to the vehicle for lowering the forward end of said draft member as the front end of the implement is raised.

20. An agricultural implement comprising an implement frame, supporting wheel means for said frame, a draft member pivotally connected intermediate its ends with said frame, forwardly extending arms pivotally connected with the forward end of said frame, a ground engaging gauge wheel journaled at the forward ends of said bars, a rock shaft carried by said frame adjacent the forward end thereof and having an arm link connected to said gauge wheel to raise and lower the same relative to the implement frame, said rock shaft carrying a second arm, a rearwardly extending link connected with said second arm to actuate said rock shaft, a second rock shaft journaled on said frame, a lever and an arm fixed on said last named rock shaft, said last named arm being connected with said link and said lever being adapted to swing said last mentioned arm to exert a thrust on said link and rock said first rock shaft, thereby raising the front end of the implement frame relative to the gauge wheel, and means operated by one of said rock shafts for raising the rear end of said draft member relative to the frame for lowering the forward end of said draft member as the front end of the implement is raised, said lever actuated arm and link being adapted to move into extended alignment as the forward end of the implement is raised and continued rocking of the lever serving to exert a pull on said link to hold the gauge wheel in elevated position while still continuing to lower the forward end of said draft member relative to the implement.

21. An agricultural implement comprising a frame, a pair of laterally spaced ground engaging means supporting said frame for tilting movement in a generally vertical direction, a draft member pivotally connected with said frame adjacent the front end thereof, swingably mounted gauge wheel means arranged to support at least a portion of the weight of said frame and disposed adjacent the forward end of the latter, and means interconnected with both said draft member and said gauge wheel so that as the latter is swung downwardly relative to the frame the forward end of the draft member is swung downwardly a proportional amount.

FRANK T. COURT.